Dec. 12, 1950 G. L. WILMOT 2,533,655
APPARATUS FOR SEPARATING MATERIALS
OF DIFFERENT SPECIFIC GRAVITIES
Filed April 4, 1947 2 Sheets-Sheet 1

INVENTOR
GEORGE L. WILMOT
BY John D. Myers
ATTORNEY

Dec. 12, 1950   G. L. WILMOT   2,533,655
APPARATUS FOR SEPARATING MATERIALS
OF DIFFERENT SPECIFIC GRAVITIES
Filed April 4, 1947   2 Sheets-Sheet 2

INVENTOR
GEORGE L. WILMOT
BY John D. Myers
ATTORNEY

Patented Dec. 12, 1950

2,533,655

UNITED STATES PATENT OFFICE 2,533,655

APPARATUS FOR SEPARATING MATERIALS OF DIFFERENT SPECIFIC GRAVITIES

George L. Wilmot, Hazleton, Pa., assignor to Wilmot Engineering Company, a corporation of Pennsylvania Application April 4, 1947, Serial No. 739,470

10 Claims. (Cl. 209—159)

The present invention relates generally to apparatus for effecting the separation of materials of different specific gravities and pertains more particularly to apparatus useful for separating coal from the impurities with which it is usually obtained from the mine.

The theory of the separation method with which my improved apparatus is employed has been well established and forms the basis of a number of coal separation and classification processes in common use. Briefly stated, this method involves subjecting a mixture of coal and its common impurities to an upwardly flowing column of water, causing hindered settling of all components, with the rate of upward flow of water so controlled that the coal, which is the lightest component, is carried off at the top of the column, while the components of intermediate and highest specific gravity are drawn off at the bottom.

According to one of the most successful modifications of this method taught by the prior art, the upward flow of water in the separating column is changed in velocity periodically, in accordance with changes in density of the fluid mass in the column, resulting in periods of greater and less hindered settling of the solid components of the mixture to be separated, such changes in hydraulic state of the separating medium resulting in a more efficient separation of the coal from the components of intermediate and greater specific gravity, and also in a reduction of the amount of coal discarded with the heavier waste products. In more specific terms, the above method effects the desired separation by changing the hydraulic state, i. e., the velocity of upflow, of the liquid medium effecting the settling in accordance with changes in density of the medium due to stratification of materials therein and settling out of materials therefrom. By so decreasing the resistance to downward settling when the density increases as to prevent material of intermediate specific gravity from accumulating near enough to the top of the column so as to be discharged with material of lowest specific gravity (high grade coal), and by so increasing the resistance to downward settling when the density is decreased as to prevent the settling of material of lowest specific gravity with the heavier components to a common discharge, a good separation of the coal from its impurities is effected.

It has been my experience, however, that separation methods based on the mechanism of intermittently changing the hindered settling conditions have not succeeded in preventing a very considerable amount of heavier materials from going over with the coal, or of coal being discharged with the discarded materials. Accordingly, it is a broad object of this invention to provide an improved apparatus for carrying out the above process in a more efficient manner than has been possible with apparatus hitherto employed for this purpose.

A more specific object of the invention is to provide a sorting column for use with the above described process which incorporates means for retarding the upward flow of materials of intermediate specific gravity when such materials approach the upper discharge of the column, thus preventing an appreciable discharge of such materials with the valuable lightest materials.

Another object is to provide a cyclicly operating valve means in the lower discharge of the sorting column, automatically controlled by the density of the fluid mass in the column, which valve means will be closed at the end of that period in the changing hindered settling cycle when the upward flow of water is at its lowest velocity (conditions of relatively unhindered settling) to trap any of the lightest materials which may settle with the heavier materials during the period of relatively unhindered settling, and which gradually opens as the velocity of upflowing water is increased and as the hydraulic head thereof gradually increases, permitting the lightest materials to be carried upwardly in the column and the heavier materials to fall through the lower discharge into the discard.

An additional object is to provide a sorting column for the above purpose in which the bottom surface is so sloped as to afford an optimum balance between the upward displacement of heavier materials and the settling of lightest materials throughout the entire cyclic change in velocity of the upwardly flowing water, whereby a minimum of lightest material will move along the bottom toward the lower discharge when the velocity of the upward flow of water is lowest and a minimum of the heavier materials will be carried upward when the velocity of the upward flow of water is greatest, while at the same time preventing any accumulation of any of the materials on the bottom of the column.

With the above and other objects in view, the nature of which will appear as the description proceeds, the invention will now be described, reference being made to the accompanying drawings in which.

Figure 1:
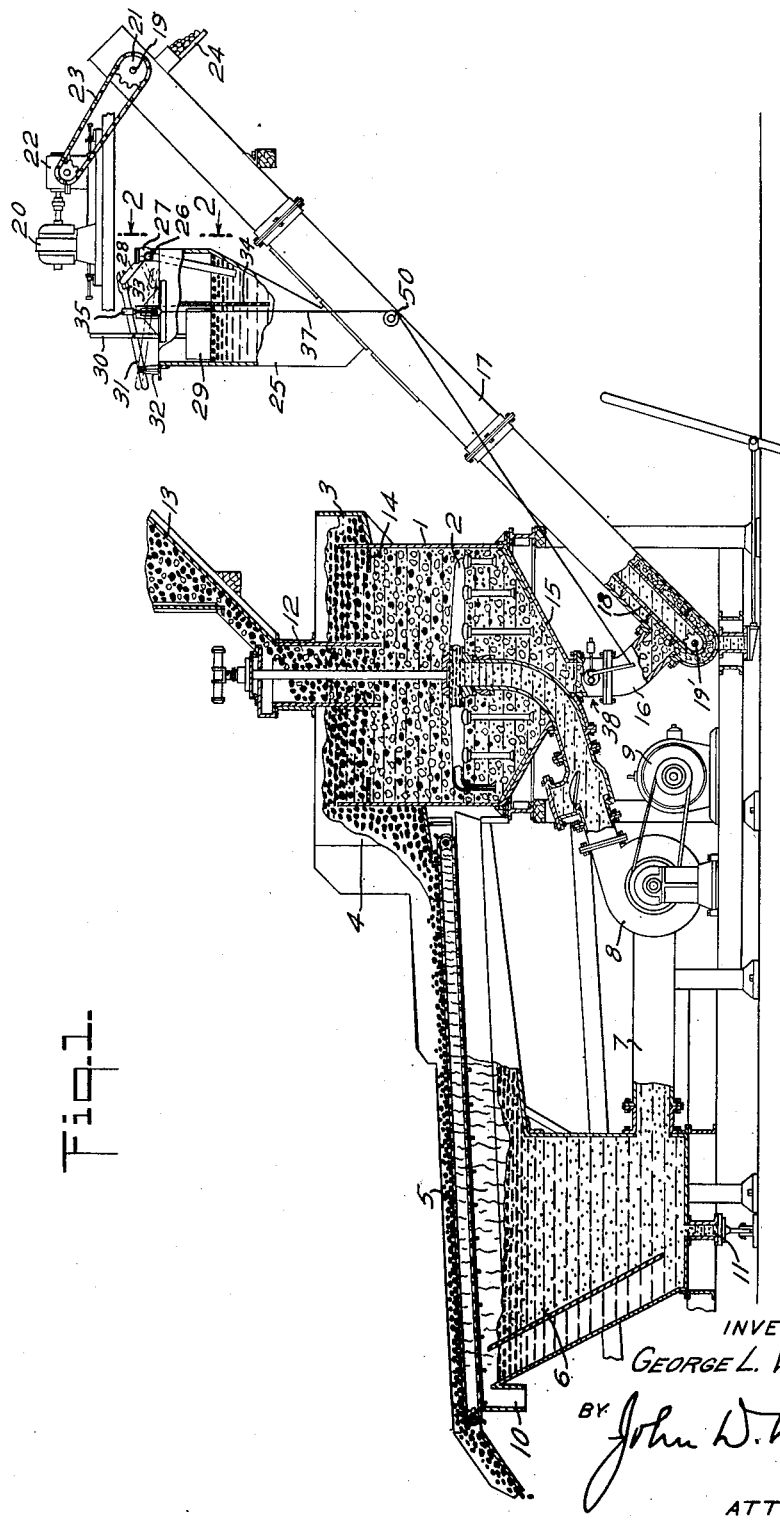
Fig. 1 is a somewhat diagrammatic side elevational view, partly in section, of an apparatus for effecting the separation of materials of different specific gravities, and embodying the improvements of the present invention.

Referring now to the drawings, particularly to Fig. 1, there is shown a separation apparatus having a sorting column 1 open at its upper end and provided with a hydraulic agitator 2 through which most of the water used in the separation process is introduced into the column. The agitator may, of course, be stationary or rotatable, as desired. Surrounding the column 1 at its upper end is a launder 3 which receives the water and suspended materials of low specific gravity overflowing from the column. The launder is provided with a discharge opening 4 through which the overflow is conducted onto an endless conveyor screen 5, moved by any convenient means (not shown), which delivers to storage all solid particles greater than screen size. A sump 6 beneath the screen conveyor collects the overflow water and undersize screenings for recirculation through the column through a pipe 7 and a centrifugal pump 8 driven by a motor 9. The sump is provided with an overflow 10 and a slush gate 11 for removal of surplus accumulated solids according to customary practice.

Located centrally of the column 1 and adjacent the upper end thereof is a chute or pipe 12 through which the mixture of solids to be separated is introduced into the column. A hopper 13 or other convenient feeding means is employed to deliver a continuous flow of solids to the chute 12. Secured to the wall of the column a short distance below the top thereof is a perforated annular baffle 14 which is effective to diffuse and retard strong upward currents near the peripheral discharge edge of the column and thereby to prevent the overflowing of materials of higher specific gravity with the lightest materials. The width of the annulus of the baffle may be varied between rather wide limits as desired, and I have found that the ratio of the width of the annulus to the diameter of the column may vary between about 5% and about 16% with excellent results, the larger ratios in this range being preferred in tanks of smaller diameter. For example, baffles having annular widths of 4 inches and 15 inches have been found effective for their purpose, as above stated, when employed, respectively, in separation columns having diameters of 2 feet and 24 feet.

As shown in Fig. 1, the column 1 has a conical bottom portion 15 sloping downwardly toward the center to a refuse discharge pipe 16, the pipe 16 in turn communicating with a conveyor chamber 17 extending obliquely upwardly to a height exceeding that of the column 1. A flight conveyor 18 is enclosed in chamber 17 and is journaled at its ends on bearings 19 and 19'. An electric motor 20 suitably connected to a driving sprocket 21 of the conveyor through a gear reduction system 22 and a driving chain 23 provides driving power for the conveyor. Refuse entering the lower part of the chamber 17 is thus carried upwardly by the conveyor to the discharge 24 of the chamber.

The slope of the bottom conical portion 15 is an important factor in determining the efficiency of operation of sorting columns of the type described above. While it has apparently been found necessary in prior art apparatus to employ a sloping bottom to conduct the settled solids to the lower central discharge, it has not been appreciated heretofore, so far as I am aware, that the angle of this slope can materially affect the concentration of valuable low specific gravity materials in the refuse discharged from the bottom of the column. To illustrate this effect, assume a set of conditions for separating high grade coal from low grade coal and slate employing a sorting column of a construction similar to that above described and using an upward flow of water intermittently changing in velocity in known manner. As the density of the fluid mass increases with the accumulation of solids in the column to the point where there is danger of forcing the heavier low grade coal into the overflow with the light high grade coal, the velocity of the upwardly flowing water is decreased, permitting less hindered settling of all solids, including high grade coal. When the upward velocity of the water is at its lowest value the suspended solids undergo almost free settling, especially adjacent the wall of the column where the motion of the water is at a minimum. Under these conditions even the light high grade coal settles at an appreciable rate. Where the bottom of the column is properly sloped, however, it is possible to preserve a sufficient updraft of water along such slope to hinder the settling of the high grade coal while at the same time permitting the more rapid settling of the heavier components. The slope therefore should be great enough to permit a sufficient updraft for the separation of the solids of different specific gravities and also to prevent accumulation of solids on the bottom; on the other hand, the slope should not be so great as to provide a steep settling path along the bottom of the sorting column, for then the lightest materials may be lost in the lower discharge when the upflow of water is at its lowest velocity.

I have found that where the sorting column has a depth of the same order as its diameter, for example, where the depth varies between about 0.5 and about 1.5 times the diameter, a slope in the conical bottom of about 28°, relative to the horizontal, minimizes the concentration of high grade coal in the refuse discharge while permitting a high throughput of raw feed through the sorting column.

As previously stated the method of separation employed in the present apparatus involves changes in velocity of the upwardly flowing water in the column, the velocity varying inversely as the density of the fluid mass in the column 1. Accordingly, I provide a vertical float chamber 25 in communication with the chamber 17, the chamber 25 having an independent water source 26, controlled by a valve 27 having an operating lever 28. The valve 27 is of the quick acting type and adapted to be closed abruptly when lever 28 is in a predetermined upward position, and to remain closed until the lever 28 is moved to a predetermined lower position, at which time it abruptly opens, releasing water into chamber 25.

The level of the water in chamber 25 of course varies, as will be more fully explained hereinafter, but it is always somewhat higher than that in the colunmn 1. A float 29, having an upwardly extending arm 30, rides upon the surface of the water in chamber 25. The arm 30 is pivotally connected to a lever 31 between its fulcrum 32 and its free end 33 where it is slidably attached to the end of lever 28 of the valve 27. Thus, when the float falls to a predetermined low level the valve 27 is abruptly opened and remains open until the float rises to predetermined higher level, at which time valve 27 is abruptly closed. A baffle 34 is employed in the chamber 25 to minimize disturbance of float 29 by any turbulence created by the flow of water into the chamber. A lever 35, fulcrumed intermediate its ends on a journal 36 supported by the chamber 25, is slidably connected at one end to the lever 31 and is attached at its other end to a cable 37 (see Fig. 2).

Figure 3:
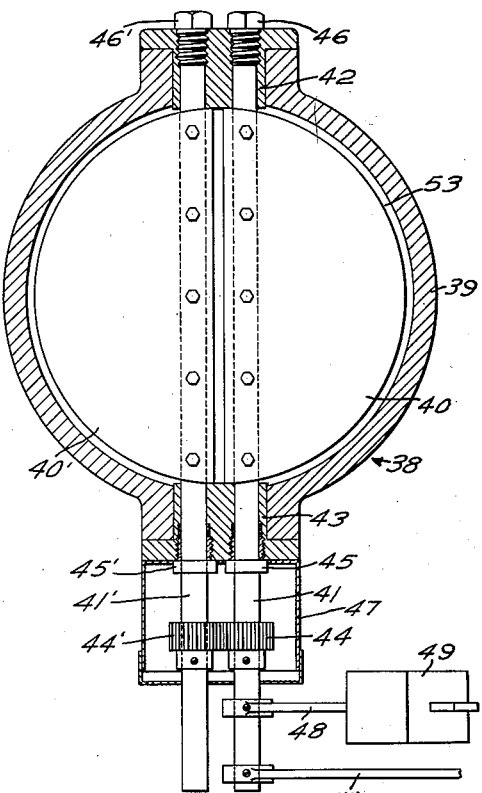
Fig. 3 is a horizontal cross-sectional view of the refuse control valve employed in my improved separating apparatus.
Figure 4:
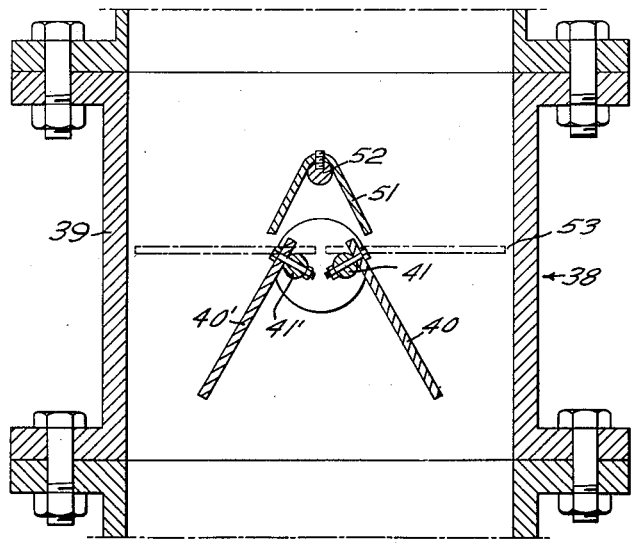
Fig. 4 is a vertical sectional view of the refuse control valve shown in Fig. 3.
Figure 5:
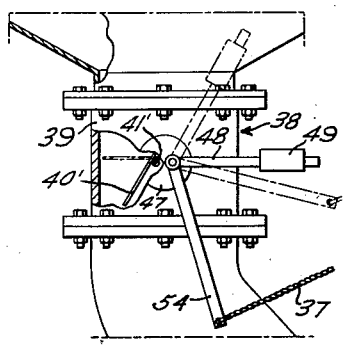
Fig. 5 is an elevational view, partly in section, of the position of the refuse control valve in my separating apparatus, and showing the valve gates in two of their many possible positions.

Referring now particularly to Figs. 3, 4 and 5 for a description of the control employed to govern the release of refuse materials from the column 1, it will be seen that a valve, designated generally as 38, is positioned in the refuse discharge pipe 16. The valve 38 comprises a valve body 39 and a pair of gates 40, 40' of substantially semi-circular form fixed respectively along their adjacent diametrical edges to shafts 41, 41' which are pivotally journaled in the valve body in stuffing boxes 42 and 43 as shown. The radius of the gates is considerably smaller than the radius of the interior of the valve body and thus an annular space 53 is preserved between the gates and the valve body when the gates are in closed position. The shafts 41, 41' extend through the stuffing box 43 and are geared together externally thereof by similar gears 44, 44'. Stuffing box 43 is sealed against water leakage by any convenient means, as by conventional packing glands 45, 45'. Studs 46, 46' or other known sealing means may be used to seal stuffing box 42. To prevent fouling of the gears 44, 44', a guard housing 47 may be provided over a short length of the shafts 41, 41' adjacent the valve body.

A crank arm 48, having a weight 49 near the free end thereof, is fixed to one of the shafts, for example 41, the crank arm being so positioned that it will not be vertical when the gates 40, 40' are in closed position and, preferably, will be capable of considerable downward travel when the weight is allowed to fall freely. One of the shafts 41, 41' carries a second crank arm 54 adjacent the end of which is fastened the other end of the cable 37. If convenient, a pulley 50 may be employed to guide the cable between the crank arm 54 and the lever 35. It will be understood, of course, that the cable 37 may be attached directly to the end of the crank 48, if desired, in which case crank 54 would not be necessary; or one of the cranks could be fixed to shaft 41 and the other to shaft 41'. These and other modifications in the arrangement of the cranks, and in the operation of the weight and cable, may be employed with satisfactory results.

Figure 2:
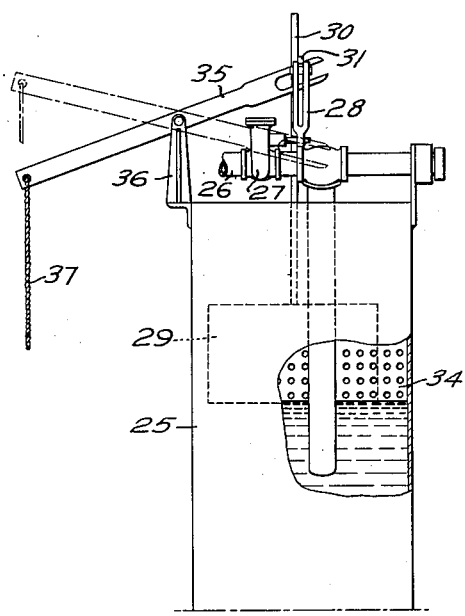
Fig. 2 is a detailed end view, taken along line 2—2 of Fig. 1 in the direction of the arrows, showing one manner of operation of the feed water valve in accordance with the present invention.

It can be seen by inspection of Figs. 1, 2 and 5 that as the float 29 rises with the level of the water in chamber 25 cable 37 is lowered permitting the weighted crank arm 48 to descend, opening both gates 40, 40' of the valve 38. Conversely, as the float 29 descends, the cable 37 is placed under tension and exerts a moment on shaft 41 opposite to that exerted by the weighted crank 48, thus closing the gates 40, 40' of the valve. When the gates of the valve are in their open position a considerable space appears between their adjacent edges (see Fig. 4). In order to prevent solid materials from lodging between these edges and thereby hindering closing thereof, a shield is disposed above the center of the gates within the valve. In Fig. 4, this shield is shown as an imperforate cover member 51 of inverted V cross-section, supported on a rod 52. Preferably, the width of the shield at its lower end is at least as wide as the maximum distance occurring between the adjacent edges of gates 40, 40' in their open position.

In discussing the operation of the apparatus of the invention, assume that raw coal, as the mixture of materials to be separated, is being fed continuously into the column 1 from the hopper 13, and that water is being introduced from the sump 6 into the column through the agitator 2 at a substantially constant rate. The upflow of the water in the column hinders the settling of the raw coal components, the light high grade coal being carried in large part over the peripheral discharge of the column by the overflowing water, and the heavier low grade coal stratifying somewhat below the upper discharge. The heavy slate settles to the bottom of the column and is discharged through lower discharge 16 as refuse. The chamber 17 with its float chamber 25, communicating with the column 1 through the lower discharge 16, introduces an additional stream of water into the column, the rate of flow of this stream varying with the density of the fluid mass in the column, whereby the variable settling conditions hereinbefore described are effected and separation of the several components of the mixture realized.

Assume now that the separation operation is just beginning, that the density of the fluid mass in the column is low, that the valve gates 40, 40' are in closed position and that valve 27 is open to supply water to float chamber 25. Under these conditions the float 29 is in its low position. Since the density of the fluid mass is low, the water from conveyor chamber 17 flows at high velocity through the annular space 53 in valve 38 and into column 1, causing hindered settling of the solids therein, sending most of the light high grade coal over the peripheral discharge as overflow, and stratifying the heavier low grade coal components somewhat below the top of the column. The heaviest materials (slate) settle quickly to the bottom of the column where they are retained temporarily on the closed gates of valve 38. The density thus built up in the column causes the level of the water in the float chamber, and therefore the float 29, to rise, gradually opening the gates 40, 40' and allowing the heavy slate to fall through discharge pipe 16.

As the density in the column continues to rise, the stratum of low grade coal approaches the top of the column; however, before an appreciable amount thereof can be raised to the level of the overflow, the float 29 rises to its upper limit and closes the water inlet valve 38. As the head of the water in float chamber 25 drops, the velocity of upflow of water in the column also drops, permitting less hindered settling of the heavier low grade coal to the discharge pipe 16. At the same time, however, the light high grade coal may settle more freely and it, too, settles in appreciable quantity. However, the rate of settling of the high grade coal is comparatively slow, so that by the time any appreciable amount descends to the vicinity of the discharge pipe 16, the float 29 has fallen to its low position, closing the gates of valve 38 and opening the water inlet valve 27.

The density of the fluid mass is now at its lowest value and water rising around the valve gates 40, 40' is at its highest velocity. Therefore, any settled high grade coal is again carried to the top of the column and the separation cycle is again commenced. Thus, at the time when the upflow of water through the column is at a low velocity and high grade coal is likely to escape through the lower discharge with low grade coal, the gates of valve 38 are closed and prevent the passage of all materials through the discharge pipe 16. In this way the present apparatus is effective to maintain the loss of high grade coal through the lower discharge at a very small value.

It will be understood that when the upflow of water is at its greatest velocity, not only the light high grade coal but the heavier low grade coal is swept upward toward the peripheral discharge at the top of column 1. The perforated baffle 14 effectively breaks up this flow along the walls of the column and so diffuses the upflowing stream that much of the low grade coal which would otherwise be forced into the overflow remains a safe distance below the peripheral discharge of the column until the density of the liquid mass reduces the upflow velocity to permit the rapid settling of low grade coal and slate. Through the use of baffle 14 I have been able to reduce the ash content of coal cleaned by the above described method to about 80% of that obtainable when the baffle is not used.

While I have described my invention principally as it relates to the separation of coal from its impurities, it will be understood that my apparatus may be employed to effect the separation of a large variety of mixtures containing materials of different specific gravity. Likewise, I do not intend to be limited by the exact mechanical construction which I have shown and described herein for purposes of illustration, except as indicated in the appended claims, since it will be apparent to those skilled in the art that many changes and modifications may be made therein without departing from the spirit of the invention.

What I desire to claim is:

1. An apparatus for the separation of materials of different specific gravities comprising, in combination, a sorting column having discharges at different levels, means for feeding a mixture of said materials continuously to said column, hydraulic agitating means for introducing water at a substantially constant rate into said column, said agitating means being adapted to deliver said water in a plurality of streams adjacent the bottom of said column to form an upward flow of water in said column whereby said materials form a fluid mass with said water, water feeding means for introducing an additional stream of water into said column through the lowermost of said discharges, the rate of water flow from said water feeding means being responsive to changes in density of said fluid mass, valve means disposed within said lowermost discharge to control the flow therethrough of material of higher specific gravity from said column, said valve means having a minimum opening therethrough of predetermined area whereby water from said water feeding means may flow continuously into said column, and float means controlled by said water feeding means for regulating the opening of said valve means progressively from a maximum to a minimum as the density of said fluid mass varies from a maximum to a minimum.

2. Apparatus in accordance with claim 1 including an annular perforated baffle disposed within said column and projecting inwardly from the wall thereof adjacent and below the uppermost of said discharges to retard the upflow of said water along the wall of said column and reduce the accumulation of said material of higher specific gravity in the vicinity of said uppermost discharge.

3. Apparatus in accordance with claim 1 wherein said valve means is a butterfly valve comprising a valve body and a pair of gate portions of substantially semi-circular shape pivotally mounted within said valve body, said gate portions being disposed in complementary relation to form a substantially circular closure when in the closed position and having a substantially smaller radius than the inside radius of said valve body, whereby a substantial annular space is formed between said gates and said valve body when the gates are in closed position.

4. An apparatus for the separation of materials of different specific gravities comprising, in combination, a sorting column open at its uppermost end to form a peripheral discharge for material of lowest specific gravity and having a discharge at the bottom thereof for material of higher specific gravity, means for feeding a mixture of said materials continuously to said column, hydraulic agitating means for introducing water at a substantially constant rate into said column, said agitating means adapted to deliver said water in a plurality of streams adjacent the bottom of said column to form an upward flow of water in said column whereby said materials form a fluid mass with said water, a water chamber communicating with said bottom discharge and extending substantially above said column, a water source including an inlet valve for said water chamber, the water from said chamber being adapted to flow into said column through said bottom discharge at a rate inversely proportional to the density of said fluid mass, float means disposed in the water in said chamber, means coupling said float means with said inlet valve for opening said inlet valve when the water in said chamber attains a predetermined low level and for closing said inlet valve when the water in said chamber attains a predetermined high level, a discharge valve disposed within said bottom discharge to control the flow therethrough of said material of higher specific gravity, said discharge valve having a minimum opening therethrough of predetermined area whereby water from said water chamber may flow continuously into said column, and means coupling said float means with said discharge valve for regulating the opening of said discharge valve progressively from a maximum to a minimum as said float means moves from its highest position to its lowest position.

5. Apparatus according to claim 4 including an annular perforated baffle disposed within said column and projecting inwardly from the wall thereof adjacent and below said peripheral discharge to retard the upward flow of said water along the wall of said column and reduce the accumulation of said material of higher specific gravity in the vicinity of said peripheral discharge.

6. Apparatus according to claim 4 wherein said discharge valve comprises a valve body and a pair of gate portions of substantially semicircular shape pivotally mounted in complementary relation within said valve body, said gate portions having a substantially smaller radius than the inside radius of said valve body, whereby a substantial annular space is formed between said gates and said valve body when the gates are in closed position.

7. In an apparatus for the separation of materials of different specific gravities which includes a sorting column wherein said materials are stratified substantially according to their respective specific gravities by subjecting them to an upward flow of water, said column having an upper discharge for material of lowest specific gravity and a lower discharge for material of higher specific gravity, and a water chamber in which water is maintained at a higher level than in said column, said chamber communicating with said column through said lower discharge for varying the flow of water through the latter in accordance with variations in density of the fluid mass in said column; a control therefor which comprises a water source including an inlet valve for said water chamber, float means disposed in the water in said chamber, means coupling said float means with said inlet valve for opening said inlet valve when said float attains a predetermined low position and for closing said inlet valve when said float attains a predetermined high position, a discharge valve disposed within said lower discharge to control the flow therethrough of said material of higher specific gravity, said discharge valve having a minimum opening therethrough of predetermined area whereby water from said water chamber may flow continuously into said column, and means coupling said float means with said discharge valve for regulating the opening thereof progressively from a maximum to a minimum as said float means moves from said high position to said low position.

8. In an apparatus for the separation of materials of different specific gravities which includes a sorting column wherein said materials are stratified substantially according to their respective specific gravities by subjecting them to an upward flow of water, said column having an upper discharge for material of lowest specific gravity and a lower discharge for material of higher specific gravity, and a water chamber in which water is maintained at a higher level than in said column, said chamber communicating with said column through said lower discharge for varying the flow of water through the latter in accordance with variations in density of the fluid mass in said column; a control therefor which comprises a water source for said water chamber, a valve in said water source operable between a completely open and a completely closed position, a float disposed upon the surface of the water in said chamber, an articulated coupling connecting said float and said valve to open said valve when said float is in a predetermined low position and to close said valve when said float is in a predetermined high position, a second valve disposed within said lower discharge to control the flow therethrough of said material of higher specific gravity, means including a cable actuated by said float for regulating the opening of said second valve progressively from a maximum to a minimum as said float means moves from said high position to said low position, said second valve comprising a valve body, a pair of gate portions of substantially semi-circular form disposed in complementary relation within said valve body, said gate portions having a substantially smaller radius than the inside radius of said valve body whereby a substantial annular space is formed between said gates and said valve body when the gates are in closed position, each of said gates being secured along its diametrical edge to a pivot shaft, said shafts projecting from said valve body and geared together in such a manner that rotation of one of said shafts in one direction causes rotation of the other of said shafts an equal amount but in the opposite direction, a crank arm carrying a weight adjacent its free end fixed to one of said shafts to produce a moment therein in one direction, a second crank arm attached to said one of said shafts, said cable being attached to said second crank arm adjacent the free end thereof whereby tension on said cable produces a moment in said first shaft opposite to the moment produced by said weight.

9. In an apparatus for the separation of materials of different specific gravities which includes a sorting column wherein said materials are stratified substantially according to their respective specific gravities by subjecting them to an upward flow of water, and a lower discharge through which materials of higher specific gravity are conducted from said column and through which water is introduced into said column, a valve for said lower discharge which comprises a valve body, a pair of gate portions of substantially semi-circular form pivotally disposed on shafts within said body in complementary relation to form a substantially circular closure when said gates are in the same plane, said shafts being respectively secured to said gates along the diametrical edges thereof and parallel to one another, said shafts projecting through said valve body and geared together in such a manner that rotation of one of said shafts causes rotation of the other of said shafts an equal amount but in the opposite direction, a shield of substantially inverted V-shape disposed within said valve body over the adjacent edges of said gate portions to prevent said materials from lodging therebetween, a crank arm carried by one of said shafts and having a weight secured adjacent the free end thereof to produce a moment about the axis of said shaft, said gate portions having a substantially smaller radius than the inside radius of said valve body whereby a substantial annular space is formed between said gates and said valve body when the gates are in closed position.

10. In coal separating apparatus wherein clean coal is discharged from the upper portion of a separating column containing an up-flowing liquid medium and heavy refuse is removed from the lower portion of said column through a refuse opening discharging into a refuse conveyor connected to said column through said opening, automatic means for controlling the discharge of refuse comprising a refuse valve in said refuse discharge opening, a float chamber connected to said refuse conveyor, said refuse valve having a minimum opening therethrough of predetermined area whereby water from said float chamber may flow continuously into said column, a float in said chamber, a water supply connected to said chamber, an inlet valve for controlling said water supply, and interconnecting means between said float and said refuse valve and between said float and said inlet valve for automatically determining the setting of said valves in accordance with the position of said float.

GEORGE L. WILMOT.

REFERENCES CITED

The following references are of record in the file of this patent:

UNITED STATES PATENTS

| Number | Name | Date |
|---|---|---|
| 655,125 | Stalcup | July 31, 1900 |
| 1,010,348 | Cobb | Nov. 28, 1911 |
| 1,125,503 | Fleck | Jan. 19, 1915 |
| 1,895,504 | Wuensch | Jan. 31, 1933 |
| 1,900,190 | Menzies | Mar. 7, 1933 |
| 1,989,937 | Lessing | Feb. 5, 1935 |
| 1,990,129 | Menzies | Feb. 5, 1935 |
| 2,125,663 | Wuensch | Aug. 2, 1938 |
| 2,288,744 | Remick | July 7, 1942 |
| 2,334,683 | Smith | Nov. 16, 1943 |
| 2,369,878 | Wiegand | Feb. 20, 1945 |

FOREIGN PATENTS

| Number | Country | Date |
|---|---|---|
| 125,781 | Great Britain | Apr. 30, 1919 |
| 558,602 | Great Britain | Jan. 12, 1944 |

OTHER REFERENCES

Selective Media Concentration, McNeill, Technical Publication No. 2084, November 1946. Script received at the office of the Institute, November 13, 1945.